(12) United States Patent
Li

(10) Patent No.: US 8,817,132 B1
(45) Date of Patent: Aug. 26, 2014

(54) HARDWARE PARTIAL FRAME ELIMINATION IN A SENSOR INTERFACE

(75) Inventor: Weining Li, Los Gatos, CA (US)

(73) Assignee: Ambarella, Inc., Santa Clara, CA (US)

( * ) Notice: Subject to any disclaimer, the term of this patent is extended or adjusted under 35 U.S.C. 154(b) by 905 days.

(21) Appl. No.: 12/690,302

(22) Filed: Jan. 20, 2010

(51) Int. Cl.
   *H04N 9/64* (2006.01)

(52) U.S. Cl.
   USPC .............. 348/231.99; 348/243; 348/248

(58) Field of Classification Search
   USPC .................... 348/231.99, 241–251
   See application file for complete search history.

(56) References Cited

U.S. PATENT DOCUMENTS

| | | | | |
|---|---|---|---|---|
| 5,850,264 | A | * | 12/1998 | Agarwal ................. 348/469 |
| 6,061,092 | A | * | 5/2000 | Bakhle et al. ............ 348/243 |
| 7,068,847 | B1 | * | 6/2006 | Chen ...................... 382/233 |
| 7,116,283 | B2 | * | 10/2006 | Benson et al. ............ 345/1.1 |
| 7,317,480 | B1 | * | 1/2008 | Cho et al. ................ 348/243 |
| 2002/0149679 | A1 | * | 10/2002 | Deangelis et al. ....... 348/207.99 |
| 2004/0021615 | A1 | * | 2/2004 | Benson et al. ............ 345/1.1 |
| 2008/0180555 | A1 | * | 7/2008 | Sato et al. ............... 348/248 |

OTHER PUBLICATIONS

Micron Technology, Inc., Boise, ID, "½-Inch 3-Megapixel CMOS Active-Pixel Digital Image Sensor" data sheet, Rev C, Sep. 2004.

* cited by examiner

*Primary Examiner* — Timothy J Henn
*Assistant Examiner* — Pritham Prabhakher
(74) *Attorney, Agent, or Firm* — Christopher P. Maiorana, PC

(57) ABSTRACT

A method for synchronizing a first circuit to an electro-optical sensor is disclosed. The method generally includes steps (A) to (D). Step (A) may generate with the first circuit a configuration signal that conveys a request to capture at least one frame of a plurality of periodic frames. Step (B) may receive the periodic frames at a second circuit from the electro-optical sensor. Step (C) may discard a first frame of the periodic frames where the first frame precedes the request. Step (D) may store a plurality of active pixels in a second frame of the periodic frames in a memory where the second frame follows the request. The second circuit is generally a hardware implementation.

20 Claims, 4 Drawing Sheets

HARDWARE PARTIAL FRAME ELIMINATION IN A SENSOR INTERFACE

FIELD OF THE INVENTION

The present invention relates to a method and/or architecture for digital video cameras generally and, more particularly, to hardware partial frame elimination in a sensor interface.

BACKGROUND OF THE INVENTION

Conventional video processing electronics inside a video camera moves frame data from a sensor to a buffer as the frames are created. The frame data is later moved from the buffer to a controller for processing. In some situations, such as at startup, partial frames are created and subsequently stored in the buffer. Since the partial frames are considered unusable, the controller has to identify and eliminate the partial frames from the buffer. In other situations, new frames are created faster than the controller can process the existing frames already in the buffer. Therefore, the controller suspends processing of a current frame and overwrites an older buffered frame with the newest frame. The partial frame elimination and frame overwriting can be costly and time consuming to the controller.

SUMMARY OF THE INVENTION

The present invention concerns a method for synchronizing a first circuit to an electro-optical sensor. The method generally includes steps (A) to (D). Step (A) may generate with the first circuit a configuration signal that conveys a request to capture at least one frame of a plurality of periodic frames. Step (B) may receive the periodic frames at a second circuit from the electro-optical sensor. Step (C) may discard a first frame of the periodic frames where the first frame precedes the request. Step (D) may store a plurality of active pixels in a second frame of the periodic frames in a memory where the second frame follows the request. The second circuit is generally a hardware implementation.

The objects, features and advantages of the present invention include providing a hardware partial frame elimination in a sensor interface that may (i) eliminate partial frames captured at startup, (ii) eliminate partial frames captured after a reset, (iii) provide a clean frame drop when a controller does not keep up with a sensor speed and/or (iv) synchronize the sensor and the controller on a frame-by-frame basis.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
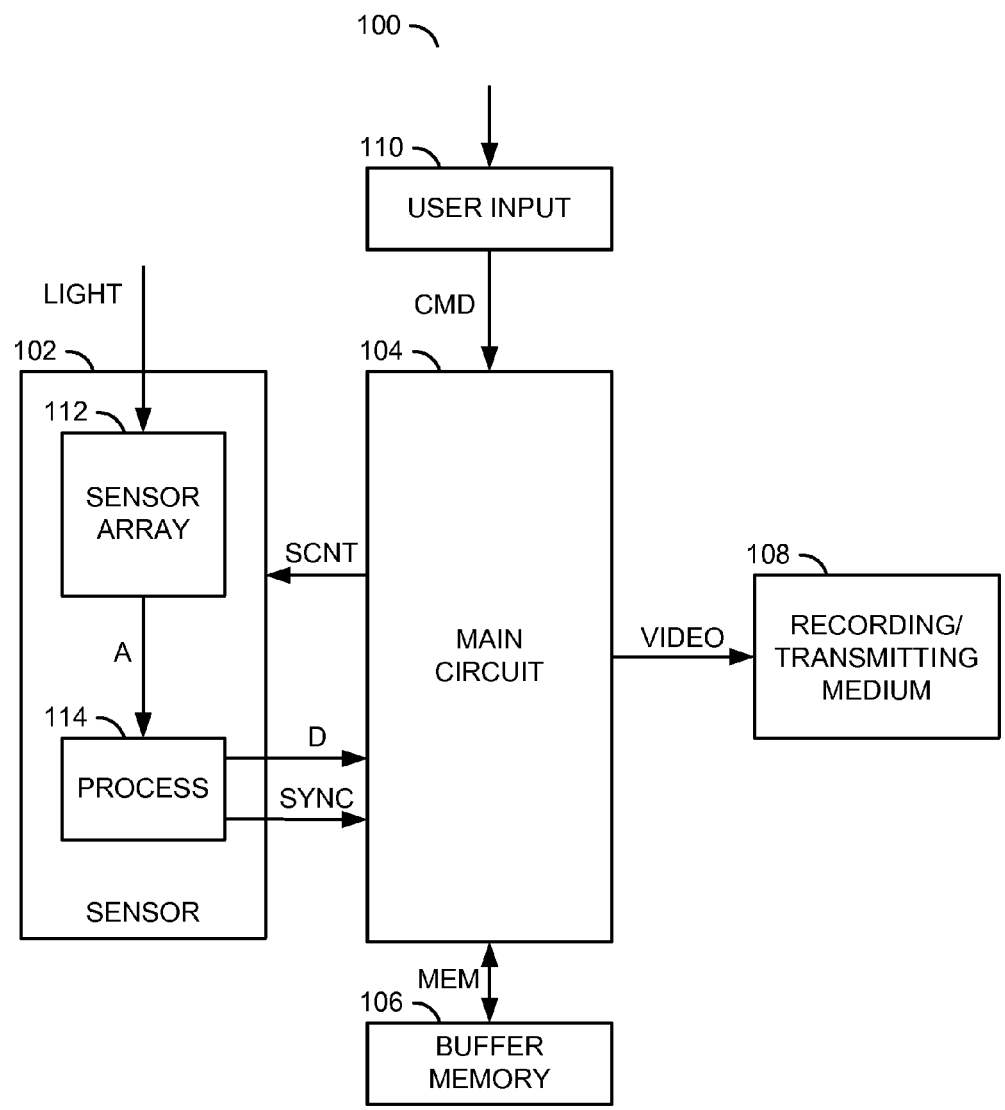
FIG. 1 is a block diagram of an example implementation of an apparatus.

Referring to FIG. 1, a block diagram of an example implementation of an apparatus 100 is shown. The apparatus (or system) 100 may be referred to as a digital video camera. The apparatus 100 generally comprises a circuit (or module) 102, a circuit (or module) 104, a circuit (or module) 106, a circuit (or module) 108 and a circuit (or module) 110. An optical signal (e.g., LIGHT) may be received by the circuit 102. The circuit 102 may generate and present a digital signal (e.g., D) to the circuit 104. A synchronization signal (e.g., SYNC) may also be generated by the circuit 102 and received by the circuit 104. A sensor control signal (e.g., SCNT) may be generated and presented from the circuit 104 to the circuit 102. The circuit 104 may also generate and present a video signal (e.g., VIDEO) to the circuit 108. A command signal (e.g., CMD) may be generated by the circuit 110 and presented to the circuit 104. A signal (e.g., MEM) may be exchanged between the circuit 104 and the circuit 106. The circuits 102 to 110 may be implemented in hardware, software, firmware or any combination thereof.

The circuit 102 may implement an electro-optical sensor circuit. The circuit 102 is generally operational to convert the optical image received in the signal LIGHT into the signal D based on parameters received in the signal SCNT. The signal D may convey a sequence of periodic optical images (e.g., fields, frames, pictures). The signal SYNC generally conveys synchronization information related to the images and the pixels within. The signal SCNT may carry windowing, binning, read rate, offset, scaling, color correction and other configuration information for use by the circuit 102. The images may be generated having an initial resolution and an initial color space (e.g., a Bayer color space) at an initial data rate. In some embodiments, the circuit 102 may include an image pipeline or other image source that supplies source images in the signal D.

The circuit 104 may be referred to as a main circuit. The main circuit 104 is generally operational to generate the signal VIDEO by processing the images received in the signal D. The circuit 104 may be operational to generate the signal SCNT based on the user selections received through the signal CMD. The circuit 104 may load and store data to the circuit 106 through the signal MEM. In some embodiments, the circuit 102 and the circuit 104 may be fabricated in (on) separate dies. In other embodiments, the circuit 102 and the circuit 104 may be fabricated in (on) the same die.

The circuit 106 may implement a buffer memory. The circuit 106 is generally operational to temporarily store image data (e.g., luminance and chrominance) for the circuit 104. In some embodiments, the circuit 106 may be fabricated as one or more dies separate from the circuit 104 fabrication. In other embodiments, the circuit 106 may be fabricated in (on) the same die as the circuit 104. The circuit 106 may implement a double data rate (DDR) synchronous dynamic random access memory (SDRAM). Other memory technologies may be implemented to meet the criteria of a particular application.

The circuit 108 may implement a medium. The medium 108 generally comprises one or more nonvolatile memory devices and/or one or more transmission media capable of storing/transmitting the video stream received in the signal VIDEO. In some embodiments, the recording medium 108 may comprise a single memory medium. For example, the recording medium 108 may be implemented as a FLASH memory or a micro hard disk drive (also known as a "1-inch" hard drive). The memory may be sized (e.g., 4 gigabyte FLASH, 12 gigabyte hard disk drive) to store up to an hour or more of high-definition digital video. In some embodiments, the recording medium 108 may be implemented as multiple media. For example, (i) a FLASH memory may be implemented for storing still pictures and (ii) a tape medium or an optical medium may be implemented for recording the video.

The transmitting medium 108 may be implemented as a wired, wireless and/or optical medium. For example, the wired transmission medium 108 may be implemented as an Ethernet network. A wireless transmission medium 108 may be implemented as a wireless Ethernet network and/or a wi-fi network. An optical transmission medium 108 may be implemented as an optical Serial Digital Interface video channel. Other types of media may be implemented to meet the criteria of a particular application.

The circuit 110 may implement a user input circuit. The circuit 110 may be operational to generate the signal CMD based on commands received from a user. The commands received may include, but are not limited to, a start recording command, a stop recording command, a zoom in command and a zoom out command. In some embodiments, the signal CMD may comprise multiple discrete signals (e.g., one signal for each switch implemented in the user input circuit 110). In other embodiments, the signal CMD may carry the user entered commands in a multiplexed fashion as one or a few signals.

The circuit 102 generally comprises a sensor array 112 and a circuit (or module) 114. The array 112 may be operational to convert the optical images into a series of values in an analog signal (e.g., A). The values conveyed in the signal A may be analog voltages representing an intensity value at a predetermined color for each individual sensor element of the circuit 112. The circuit 112 may include an electronic cropping (or windowing) capability. The electronic cropping capability may be operational to limit readout of image elements in a window (or an active area) of the circuit 112. The circuit 114 may be operational to process and then convert the analog signal A to generate the digital signal D. The circuits 112 and 114 may be implemented in hardware, software, firmware or any combination thereof.

Processing of the electronic images in the circuit 114 may include, but is not limited to, analog gain for color corrections and analog offset adjustments for black level calibrations. The conversion generally comprises an analog to digital conversion (e.g., 10-bit). An example implementation of the detector circuit 102 may be an MT9T001 3-megapixel digital image sensor available from Micron Technology, Inc., Bosie, Id. Larger or smaller detector circuits 102 may be implemented to meet the criteria of a particular application.

Figure 2:
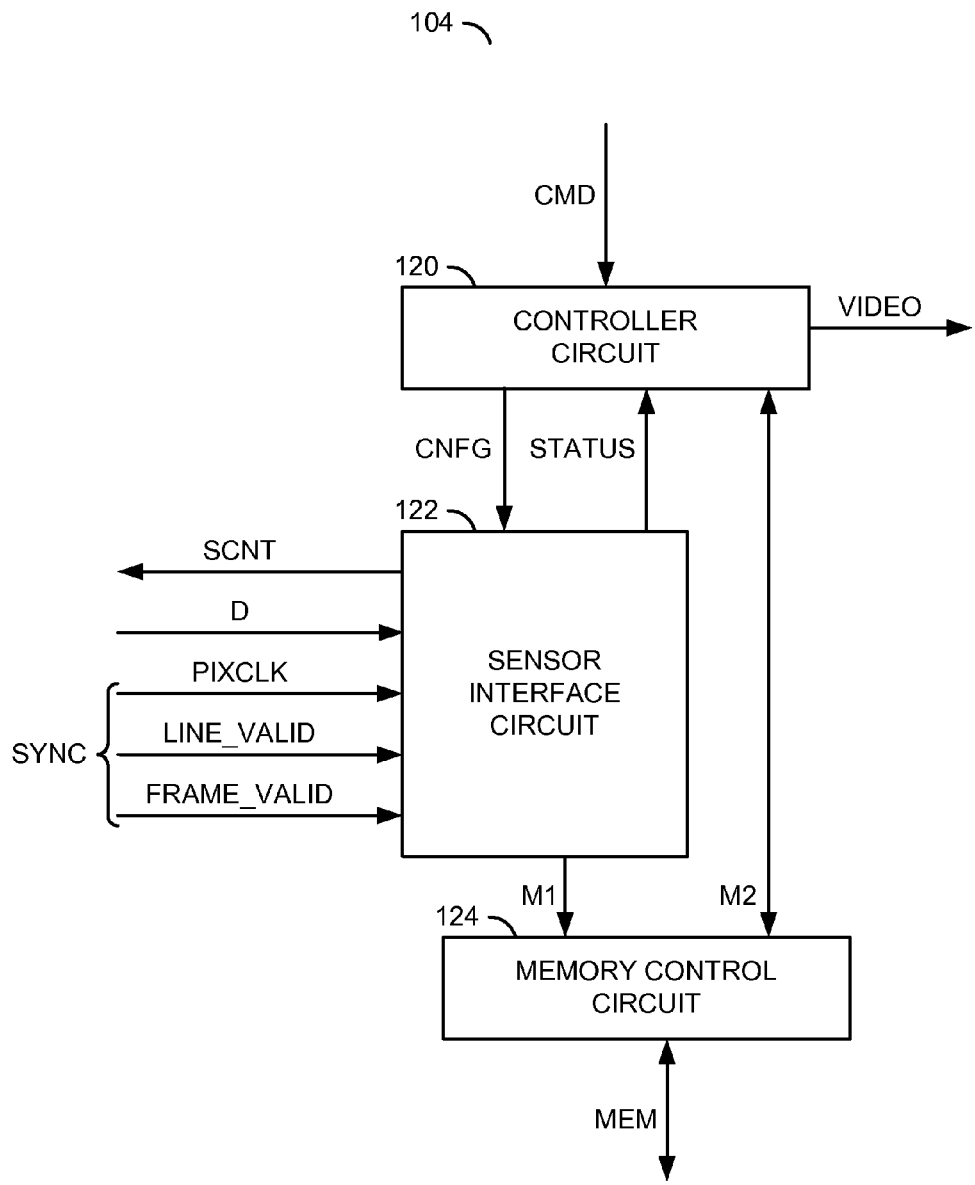
FIG. 2 is a block diagram of an example implementation of a main circuit of the apparatus in accordance with a preferred embodiment of the present invention.

Referring to FIG. 2, a block diagram of an example implementation of the circuit 104 is shown in accordance with a preferred embodiment of the present invention. The circuit 104 generally comprises a circuit (or module) 120, a circuit (or module) 122 and a circuit (or module) 124. The circuits 120 to 124 may be implemented in hardware, software, firmware or any combination thereof. In some embodiments, the circuit 122 may be implemented only in hardware or only in hardware and firmware.

The signal CMD may be received by the circuit 120. The circuit 120 may generate and present the signal VIDEO. The circuit 122 may generate the signal SCNT. The signals D and SYNC may be received by the circuit 122. The signal SYNC generally comprises a pixel clock signal (e.g., PIXCLK), a line valid signal (e.g., LINE_VALID) and a frame valid signal (e.g., FRAME_VALID). A configuration signal (e.g., CNFG) may be generated by the circuit 120 and received by the circuit 122. The circuit 122 may generate a status signal (e.g., STATUS) received by the circuit 120. A signal (e.g., M1) may be generated by the circuit 122 and received by the circuit 124. A signal (e.g., M2) may be exchanged between the circuits 120 and the circuit 124. The circuit 124 may communicate with the circuit 106 via the signal MEM.

The circuit 120 may implement a controller circuit. The circuit 120 is generally operational to process the images stored in the circuit 106 to generate the signal VIDEO and configure the circuits 102 and 122. The signal VIDEO is generally created as a video bitstream (e.g., ITU-R BT.656-4, H.264/AVC, MPEG-2, MPEG-4). Other standard and/or proprietary video codec may be implemented to meet the criteria of a particular application. Processing of the images may include, but is not limited to, decimation filtering, interpolation, formatting, color space conversion, color corrections, gain corrections, offset corrections, black level calibrations, image sharpening, image smoothing, and the like. In some embodiments, the processing may be implemented in whole or in part by software running in the circuit 120.

During or after processing of a current image by the circuit 120, the signal CNFG may be generated to request the circuit 122 capture a next image from the circuit 102. Since the processing of the current image may take longer than a single image period, the next image may by temporally displaced from the current image by one or more image periods. After making the capture request, the circuit 120 may monitor the signal STATUS to determine when the next image may be available for processing.

Generation of the signal CNFG may be used to indicate that the circuit 122 is to capture (i) an entire image, including all active pixels and all dark pixels (e.g., pixels not exposed to the signal LIGHT), (ii) only rows of the image containing active pixels or (iii) only the active pixels. The signal CNFG may also convey control information that the circuit 122 is to pass along to the circuit 102. The signal CNFG may establish, but is not limited to, the window size, rates, binning, skipping, analog gain and color correction parameters and the like for the circuit 102.

The circuit 122 generally implements a sensor interface circuit. The circuit 122 may be operational to communicate with the circuit 102 through the signal SCNT to configure the window size, rates, binning, skipping, analog gain, color correction and similar parameters of the circuit 102. The circuit 122 may also be operational to capture the periodic images carried in the signal D based on the signals PIXCLK, LINE_VALID and FRAME_VALID. Depending upon a condition of the image (e.g., partial image or full image) and the state of the latest request (e.g., capture or not capture) from the circuit 120, the circuit 122 may either discard the current image or send the current image to the circuit 106. The circuit 122 may capture one or more images per request. In some embodiments, the circuit 122 may be implemented as only hardware. In other embodiments, the circuit 122 may implement some firmware that is executed independent of any operations of the circuit 120.

The circuit 124 may implement a memory control circuit. The circuit 124 is generally operational to read and write data to and from the circuit 106. Newly captured images may be received by the circuit 124 from the circuit 122 via the signal M1. The images may subsequently be written into the circuit 106. Buffered images and other data may be exchanged between the circuit 106 and the circuit 120 through the circuit 124 using the signal M2.

Synchronization of the pixel data in the signal D arriving at the circuit 122 may be achieved through the signal PIXCLK. In some embodiments, the pixel data in the signal D may be valid at each rising edge of the signal PIXCLK. The signal LINE_VALID may inform the circuit 122 when a new line of pixels is starting. The signal FRAME_VALID may identify when a new image (frame) is starting.

When the circuit 122 starts to capture an image, the signal STATUS may be generated in an optional start-of-frame state after one or more active pixels have been stored in the circuit 106. The circuit 120 may use the start-of-frame indication as permission to being processing the captured image with an understanding that more of the image has yet to be loaded into the circuit 106. Once the circuit 122 has finished moving the captured frame, or the requested portions thereof, into the circuit 106, the signal STATUS may be generated in an end-of-frame state. The circuit 120 may treat the end-of-frame state as an indication that buffering of the captured image is complete.

Figure 3:
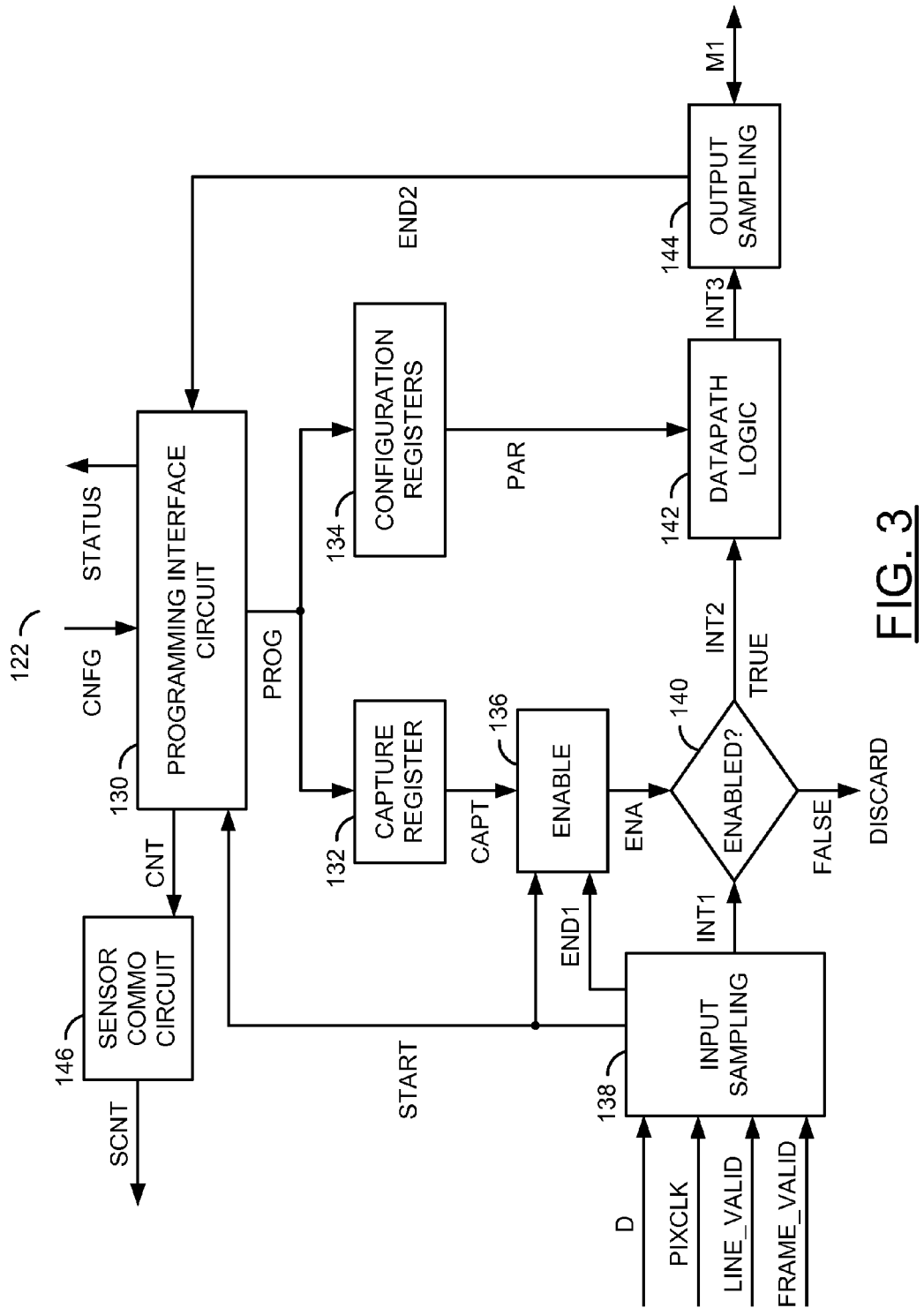
FIG. 3 is a block diagram of an example implementation of a sensor interface circuit in the main circuit.

Referring to FIG. 3, a block diagram of an example implementation of the circuit 122 is shown. The circuit 122 generally comprises a circuit (or module) 130, a circuit (or module) 132, a circuit (or module) 134, a circuit (or module) 136, a circuit (or module) 138, a circuit (or module) 140, a circuit (or module) 142, a circuit (or module) 144 and a circuit (or module) 146. The circuits 130 to 146 may be implemented in hardware, firmware or any combination thereof. In some embodiments, the circuit 130 to 146 may be implemented only in hardware or only in hardware and firmware.

The signal CNFG may be received by the circuit 130. The circuit 130 may generate the signal STATUS. A program signal (e.g., PROG) may be generated by the circuit 130 and received by the circuits 132 and 134. A control signal (e.g., CNT) may be generated by the circuit 130 and received by the circuit 146. The signal SCNT may be generated by the circuit 146. A capture signal (e.g., CAPT) may be generated by the circuit 132 and received by the circuit 136. The circuit 136 may generate an enable signal (e.g., ENA) received by the circuit 140. The signals D, PIXCLK, LINE_VALID and FRAME_VALID may be received by the circuit 138. The circuit 138 may generate a start-of-data signal (e.g., START) that is received by the circuits 130 and 136. An early end-of-data signal (e.g., END1) may be generated by the circuit 138 and received by the circuit 136. An intermediate signal (e.g., INT1) may be generated by the circuit 138 and received by the circuit 140. Another intermediate signal (e.g., INT2) may be generated by the circuit 140 and received by the circuit 142. The circuit 142 may generate an intermediate signal (e.g., INT3) received by the circuit 144. The circuit 144 may interface with the circuit 124 via the signal M1. A final end-of-data signal (e.g., END2) may be generated by the circuit 144 and received by the circuit 130.

The circuit 130 may implement a programming interface circuit. The circuit 130 is generally operational to communicate with the circuit 120 to receive configuration information via the signal CNFG and report the capture status in the signal STATUS. Configuration information destined for the circuit 102 may be presented by the circuit 130 in the signal CNT to the circuit 146. Configuration information to request an image capture may be presented in the signal PROG to the circuit 132. Configuration information for initial signal conditioning may be presented by the circuit 130 in the signal PROG to the circuit 134. The initial signal conditioning parameters may include, but are not limited to, a digital gain value, a digital offset value, a color space conversion parameter and a resizing (e.g., upscaling or downscaling) parameter. The signal STATUS may be generated based on the signals START and END2. Where a frame capture has been programmed, the signal STATUS may be generated to indicate a start-of-frame in response to the signal STATUS transitioning from an inactive state (e.g., a logical zero or low state) to an active state (e.g., logical one or high state). The signal STATUS may be generated to indicate an end-of-frame in response to the signal END2 transitioning from the inactive state to the active state.

The circuit 132 may implement a register. The circuit 132 may be operational to store the capture request state initiated by the circuit 120. If a capture has been requested (e.g., a capture "on" state), the circuit 132 may assert the signal CAPT in a true state (e.g., a logical one or high state). If the capture has been cancelled (e.g., a capture "off" state), the circuit 132 may assert the signal CAPT in a false state (e.g., a logical zero of low state).

The circuit 134 may implement a set of registers. The circuit 134 may buffer parameters received via the signal PROG for the initial signal conditioning of the images to be stored in the circuit 106. The various parameters received in the signal PROG may be presented in the signal PAR to the circuit 142.

The circuit 136 may implement a latch. The circuit 136 is generally operational to generate the signal ENA based on the signals CAP, START and END1. Where the signal START transitions from the inactive state to the active state, the circuit 136 may latch the capture on/off state of the signal CAPT. The latched capture on/off state may be presented in the signal ENA as an enable/disable state. Where the signal END1 transitions from the inactive state to the active state to indicate and end-of-frame, the circuit 136 may present the signal ENA in the disabled state. At startup and reset, the circuit 136 may present the signal ENA in the disabled state to discard a potentially partial image that may be present in the signal D.

The circuit 138 may implement an input sampling circuit. The circuit 138 may be operational to receive the pixel data received in the signal D based on the synchronization information of the signal PIXCLK. The received pixels may be presented in the signal INT1. The circuit 138 may also be operational to generate the signal START based on the synchronization information received in the signals LINE_VALID and FRAME_VALID and the capture configuration determined by the circuit 120. In a full frame configuration, the signal START may be asserted at the beginning of each image. In an active row configuration, the signal START may be asserted at the beginning of each row in the image that contains active pixels. Hence, the circuit 122 may buffer dark pixels of the active rows in the circuit 106 and discard rows containing only dark pixels. Active pixels may be the pixels of the array 112 illuminated by the signal LIGHT. Dark pixels may be the pixels of the array 112 not illuminated by the signal LIGHT. In an active-only configuration, the signal START may be asserted at the beginning of the active pixels in each row. In the active-only configuration, all of the active pixels may be buffered in the circuit 106 and all dark pixels may be discarded. The signal END1 may transition from the inactive state to the active state at the end of each image, last active row or last active pixel accordingly.

The circuit 140 may implement a gating circuit. The circuit 140 may be operational to pass or discard the pixel data in the signal INT1 based on the enable/disable state of the signal ENA. Where the signal ENA is in the enable state, the circuit 140 may pass the pixel data from the signal INT1 to the signal INT2. Where the signal ENA is in the disabled state, the circuit 140 may dump the pixel data received in the signal INT1.

The circuit 142 may implement a signal conditioning circuit. The circuit 142 is generally operational to perform the initial signal conditioning of the captures images in the signal INT2. The parameters stored in the circuit 134 may control the processing performed by the circuit 142. The processing may include, but is not limited to, digital gain adjustments, digital offset adjustment, color space conversion and resizing. The processed images may be presented in the signal INT3.

The circuit 144 may implement an output sampling circuit. The circuit 144 may be operational to transfer the processed images through the circuit 124 to the circuit 106 and generate the signal END2. The signal END2 may transition from the inactive state to the active state at the end of each image, last active row or last active pixel accordingly.

The circuit 146 may implement a communication circuit. The circuit 146 is generally operational to transfer the configuration information for the circuit 102 from the signal CNT to the signal SCNT.

Figure 4:
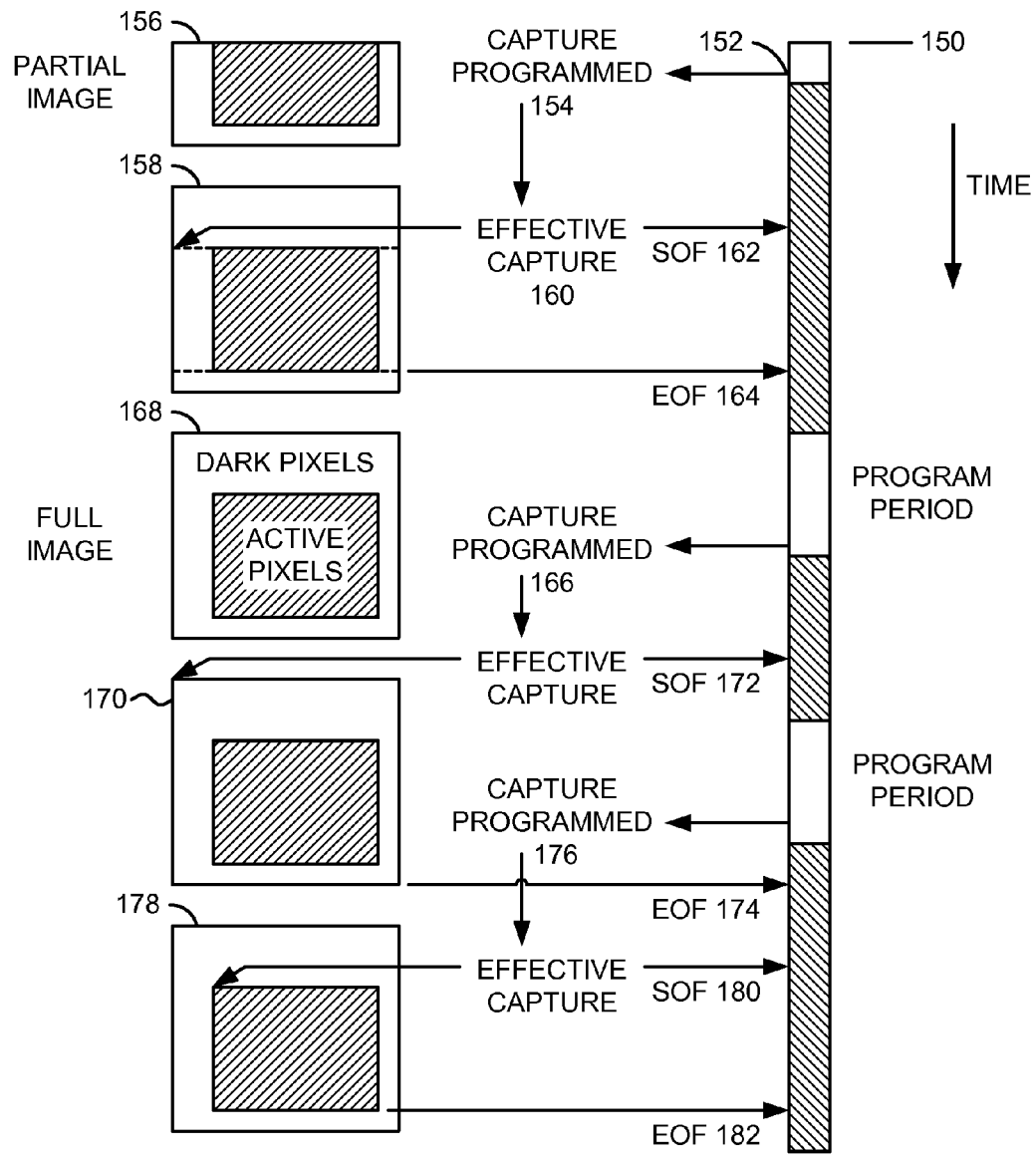
FIG. 4 is a diagram of a timing sequence of images.

Referring to FIG. 4, a diagram of a timing sequence of images is shown. The circuit 102 may provide the images on a periodic basis. Programming execution in the circuit 120 is generally not fixed to the image period. Synchronization may be achieved by the circuit 120 requesting an image capture by the circuit 122. The circuit 120 signals the circuit 122 through the signal CNFG to generate an output image for downstream processing. Because capture of the period images may be effective at the start of a next active region, alignment may be automatically established between the circuit 120 and timing of the circuit 102. After the partial startup image has been eliminated, the circuit 122 may maintain synchronization between the circuit 102 and the circuit 120 on a frame-by-frame basis to reduce a software effort in the circuit 120.

At startup and at reset time 150, the circuits 130-146 may have default configurations that discard the incoming pixels until a request is received from the circuit 120. At a later time 152, the circuit 120 may issue an initial capture request 154. In particular, the circuit 138 may treat the incoming pixel data 156 as image data, even through the signal D may be between images. The circuit 136 may default to the disabled state and so the circuit 140 may block the pixel data 156 from the circuit 142. Furthermore, the circuit 144 may not transfer any data to the circuit 106. As such, the circuit 122 may reduce a software effort in the circuit 120 to deal with partial images.

The capture request 154 may be held by the circuit 132 until a full image 158 is detected. The circuit 138 may assert the signal START at the beginning of the image/active row/active pixel (e.g., active row is illustrated) thereby causing the capture request to be latched into the circuit 136 as an effective capture 160. When the start is detected, the circuit 122 may indicate a start-of-frame (SOF) 162 to the circuit 120 in the signal STATUS. The image 158 may then be passed by the circuit 140, processed by the circuit 142 and transferred from the circuit 144 through the circuit 124 into the circuit 106. The circuit 122 may inform the circuit 120 of an end-of-frame (EOF) 164 when finished moving a last row of active pixels in the image 158 into the circuit 106.

Until some or all of the image data has been copied into the circuit 106, the circuit 122 may stop the circuit 120 from proceeding by using the signal STATUS. The signal STATUS may be generated to disallow a next set of programming to execute in the circuit 120. After part or all of the image 158 has been captured, the circuit 122 may inform the circuit 120 through the signal STATUS to allow the next set of programming to proceed. The circuit 124 may then copy the image 158 from the circuit 106 to the circuit 120 where the processing continues. If the circuit 122 is reset to a state as if in an active region of an image without capture, the requested capture may automatically start at the beginning of a next image (e.g., frame, active row or active pixel). Thus, any partial images may be filtered out.

As processing of the image 158 by the circuit 120 nears completion, or the processing finishes, the circuit 120 may issue another capture request 166 to the circuit 122. If a next image 168 has already started, the circuit 122 may buffer the request, discard the image 168 (e.g., a clean frame drop) and wait for another image 170. When a start of the image 170 is detected (e.g., a start of frame is illustrated), the circuit 122 may indicate a start-of-frame 172 to the circuit 120 through the signal STATUS. Image capture may continue until an end of the image 170 where the circuit 122 signals an end-of-frame 174 to the circuit 120.

The circuit 120 may issue another capture request 176. If processing of the image 170 completes quickly, the capture request 176 may result in the next image 178 being accepted by the circuit 122. Upon detecting a start condition (e.g., start of active pixels is illustrated), the circuit 122 may signal a start-of-frame 180 to the circuit 120. Detection of an end of the active pixels may result in the circuit 122 issuing an end-of-frame 182 indication to the circuit 120.

The functions performed by the diagrams of FIGS. 1-4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. A method for synchronizing a first circuit to an electro-optical sensor, comprising the steps of:
   (A) generating with said first circuit a configuration signal in response to a command signal from a user, wherein said configuration signal conveys a request to capture at least one frame of a plurality of periodic frames;
   (B) receiving said periodic frames at a second circuit from said electro-optical sensor;
   (C) receiving said configuration signal at said second circuit from said first circuit;
   (D) discarding a first frame of said periodic frames in said second circuit where said first frame precedes said receiving of said request, wherein said discarding is a hardwired operation in said second circuit; and
   (E) storing a plurality of active pixels in a second frame of said periodic frames in a memory using said second circuit where said second frame follows said receiving of said request.

2. The method according to claim 1, further comprising the step of:
   configuring said second circuit to discard additional ones of said periodic frames automatically once said second frame is in said memory.

3. The method according to claim 1, wherein said first frame comprises a partial frame.

4. The method according to claim 1, wherein said first frame comprises a full frame.

5. The method according to claim 1, further comprising the step of:
   transferring a status signal from said second circuit to said first circuit, wherein said status signal indicates that at least one pixel of said second frame is in said memory.

6. The method according to claim 1, further comprising the step of:
   transferring a status signal from said second circuit to said first circuit, wherein said status signal indicates that all of a plurality of active pixels of said second frame are in said memory.

7. The method according to claim 1, further comprising the step of:
   discarding automatically all of a plurality of dark pixels of said second frame with said second circuit.

8. The method according to claim 1, further comprising the step of:
   storing in said memory at least one dark pixel of said second frame.

9. The method according to claim 1, further comprising the step of:
   storing in said memory all of a plurality of dark pixels of said second frame.

10. The method according to claim 1, further comprising the step of:
    defaulting said second circuit to discard said periodic frames at (i) power on and (ii) reset.

11. An apparatus comprising:
    a first circuit configured to generate a configuration signal in response to a command signal from a user, wherein said configuration signal conveys a request to capture at least one frame of a plurality of periodic frames; and
    a second circuit configured to (i) receive said periodic frames from an electro-optical sensor, (ii) receive said configuration signal from said first circuit, (iii) discard a first frame of said periodic frames where said first frame precedes said receiving of said request and (iv) store a plurality of active pixels in a second frame of said periodic frames in a memory where said second frame follows said receiving of said request, wherein said discard is a hardwired operation in said second circuit.

12. The apparatus according to claim 11, wherein said second circuit is configured to discard future ones of said periodic frames automatically once said second frame is in said memory.

13. The apparatus according to claim 11, wherein said first frame comprises a partial frame.

14. The apparatus according to claim 11, wherein said first frame comprises a full frame.

15. The apparatus according to claim 11, wherein said second circuit is further configured to transfer a status signal to said first circuit, wherein said status signal indicates that at least one pixel of said second frame is in said memory.

16. The apparatus according to claim 11, wherein said second circuit is further configured to transfer a status signal to said first circuit, wherein said status signal indicates that all of a plurality of active pixels of said second frame are in said memory.

17. The apparatus according to claim 11, wherein said second circuit is further configured to discard automatically all of a plurality of dark pixels of said second frame.

18. The apparatus according to claim 11, wherein said second circuit is further configured to store at least one dark pixel of said second frame in said memory.

19. The apparatus according to claim 11, wherein said second circuit is further configured to store all of a plurality of dark pixels of said second frame in said memory.

20. An apparatus comprising: means for generating a configuration signal in response to a command signal from a user, wherein said configuration signal~conveys a request to capture at least one frame of a plurality of periodic frames;
    means for receiving said periodic frames from an electro-optical sensor;
    means for receiving said configuration signal from said means for generating said configuration signal;
    means for discarding a first frame of said periodic frames where said first frame precedes said receiving of said request, wherein said discarding is a hardwired operation; and
    means for storing a plurality of active pixels in a second frame of said periodic frames in a memory where said second frame follows said receiving of said request, wherein (i) said means for generating is part of a first circuit and (ii) said means for receiving, is part of a second circuit.

* * * * *